United States Patent [19]

Malaval

[11] Patent Number: 4,587,081
[45] Date of Patent: May 6, 1986

[54] SLAB FOR CLOSING THE VESSEL OF A FAST NEUTRON NUCLEAR REACTOR

[75] Inventor: Claude Malaval, Antony, France

[73] Assignee: Novatome, Le Plessis Robinson, France

[21] Appl. No.: 605,090

[22] Filed: Apr. 30, 1984

[30] Foreign Application Priority Data

May 6, 1983 [FR] France .............................. 83-07583

[51] Int. Cl.⁴ ............................................. G21C 13/02
[52] U.S. Cl. .................................... 376/287; 376/206; 376/295; 376/460
[58] Field of Search .............. 376/206, 287, 296, 460, 376/295; 220/200; 250/506.1, 507.1, 517.1; 126/211, 212; 52/223 R

[56] References Cited

U.S. PATENT DOCUMENTS

| 253,329 | 2/1882 | Watkins | 220/200 |
|---|---|---|---|
| 3,005,105 | 10/1961 | Lusk | 250/506.1 |
| 3,186,913 | 6/1965 | Weisner et al. | 376/295 |
| 3,200,045 | 8/1965 | Vendryes et al. | 376/206 |
| 3,226,301 | 12/1965 | Bernard et al. | 376/289 |
| 4,050,987 | 9/1977 | Wade | 376/206 |
| 4,113,558 | 9/1978 | Wade | 376/460 |
| 4,445,042 | 4/1984 | Baatz et al. | 250/506.1 |

FOREIGN PATENT DOCUMENTS

| 1218113 | 5/1960 | France | 376/460 |
|---|---|---|---|
| 1449842 | 9/1976 | United Kingdom | 376/296 |

Primary Examiner—Deborah L. Kyle
Assistant Examiner—Richard W. Wendtland
Attorney, Agent, or Firm—Pollock, Vande Sande & Priddy

[57] ABSTRACT

Slab for closing a fast neutron nuclear reactor, comprising a first central annular part (10) the diameter of which is substantially equal to the diameter of the reactor vessel (5) and a second peripheral annular part (11) connected to the first part (10) by its outer shell (14). Both parts of the slab are made in the form of steel caissons enclosing concrete. The central part (10) is strengthened by two frusto-conical shells (20, 21). The peripheral part (11) is strengthened by flat axial webs. The inner shell coincides with the outer shell (14) of the central part. The invention applies in particular to fast neutron nuclear reactors cooled with liquid sodium, of an integrated type.

10 Claims, 2 Drawing Figures

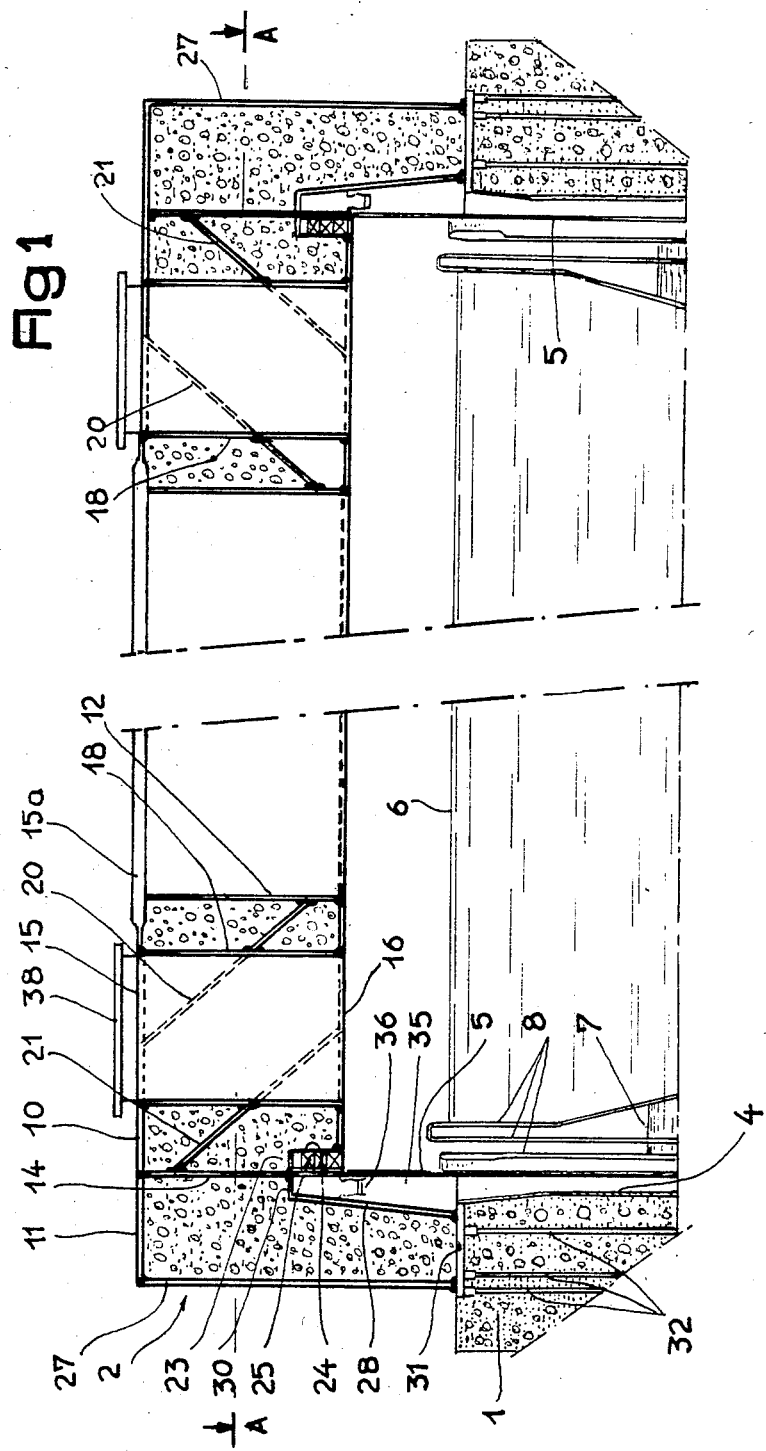

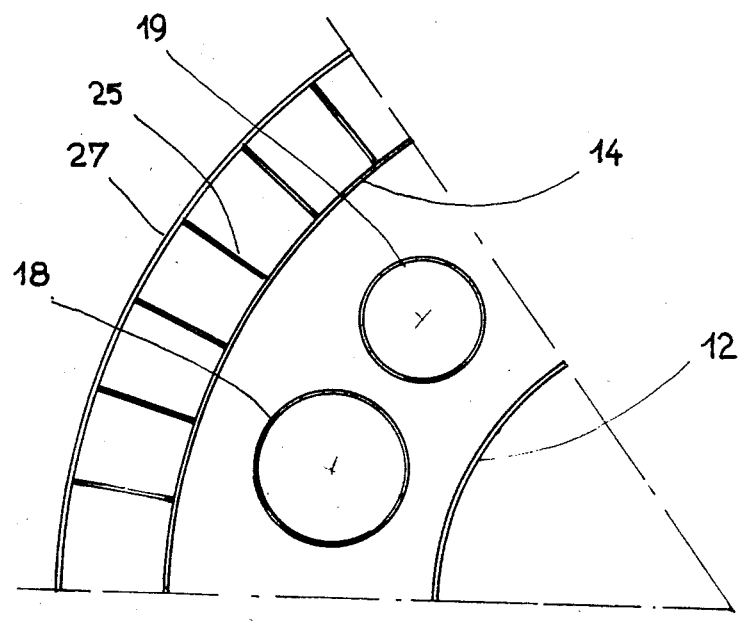

SLAB FOR CLOSING THE VESSEL OF A FAST NEUTRON NUCLEAR REACTOR

FIELD OF THE INVENTION

The invention relates to a slab for closing the vessel of a fast neutron nuclear reactor.

Fast neutron nuclear reactors generally include a structure made of concrete including a cylindrical vessel well with a vertical axis, inside which is arranged the main reactor vessel surrounded by a safety vessel and closed by the slab which rests on the upper part of the vessel well. The main vessel and the reactor safety vessel are suspended from the lower part of the slab which consists of a composite structure made of steel and concrete.

This structure consists of an annular casing filled with concrete providing, in its middle part, a cylindrical space to permit the slab to receive the large rotating plug carrying the group of devices for handling the fuel assemblies which form the reactor core and are arranged inside the vessel.

BACKGROUND OF THE INVENTION

Various designs of the slab have been offered, as well as methods of joining the slab to the concrete enclosure. However, these designs are relatively costly and complex and make use of large masses of steel and numerous welds. The connections with the reactor concrete enclosure are fragile and difficult to make and moreover do not adapt well to the temperature variations occurring during the operation of the reactor. The earthquake resistance of such slabs, in particular their connection to the concrete enclosure, is also relatively poor, which restricts their use at some sites.

SUMMARY OF THE INVENTION

The aim of the invention is therefore to offer a slab for closing the vessel of a fast neutron nuclear reactor, the concrete structure of which incorporates a cylindrical vessel well with a vertical axis, on the upper part of which rests horizontally the slab formed by a composite structure of steel and concrete which at least partly carries the vessel suspended from its lower part and which is annular in shape and pierced with cylindrical openings for the passage of components of the reactor in the vessel, this closing slab having to make it possible to facilitate its manufacture and installation on the vessel well, to withstand in a satisfactory manner the effect of reactor temperature variations during operation and, most of all, to have, in the event of earthquakes, movements which are much smaller than the structures of the prior art.

For this purpose, the slab comprises:

a first central annular part the outer diameter of which is substantially equal to the diameter of the vessel consisting of a steel caisson filled with concrete incorporating an inner shell and an outer shell having the axis of the vessel well as their axis, the shells being connected by a lower horizontal sole plate and an upper horizontal sole plate and two frusto-conical strengthening webs having the axis of the vessel well as their axis and the same angle at the top, one of which is connected to the outer shell by its large base and to the lower sole plate by its small base, and the other to the upper sole plate by its large base and to the inner shell by its small base, the small base of the first frusto-conical strengthening web having substantially the same diameter as the large base of the secondary frusto-conical strengthening web, and a second peripheral annular part joined to the first part by its outer shell forming the inner shell of the second part, of a height greater than the first part reinforced by membranes placed radially, i.e., following planes passing through the axis of the slab, this second part bearing with its lower end on the reactor structure.

BRIEF DESCRIPTION OF THE DRAWINGS

In order that the invention may be properly understood a description will now be given, by way of example, with reference to the attached figures, of an embodiment of a slab for closing a vessel according to the invention, for the case of a fast neutron nuclear reactor cooled with liquid sodium.

FIG. 1 is a view in section through a vertical plane of a slab according to the invention in position above the vessel well of the nuclear reactor.

FIG. 2 is a view in partial section along line AA of FIG. 1, showing in particular a pump passage and an exchanger passage.

DETAILED DESCRIPTION

FIG. 1 shows a part of the structure of the nuclear reactor 1 corresponding to the upper end of the vessel well on which the slab, indicated generally by the reference 2, is resting.

The inner surface of the vessel well is covered with a metal enclosure 4 which acts as a safety vessel. The main vessel 5 is suspended from the lower part of the slab in a manner which will be described later. Inside the main vessel containing sodium is arranged the inner vessel 8, of a complex structure which permits the separation of the hot sodium and the cold sodium the levels of which have been shown as 6 and 7 respectively.

The slab consists of an inner annular part 10 and an outer annular part 11.

The inner annular part 10 consists of a steel casing of an annular shape which is strengthened by bracing components and contains concrete. The casing of this annular part 10 includes an inner shell 12, an outer shell 14, an upper sole plate 15 and a lower sole plate 16. Inside the shell 12 is housed the large rotating plug, itself carrying the small rotating plug employed for the handling of fuel assemblies inside the vessel 5. The upper sole plate 15 is reinforced in its part 15a, at the periphery of the large rotating plug, to enable this massive assembly to be supported.

Inside this central part 10 of the slab are arranged passages for components, as can be seen in FIGS. 1 and 2. These passages for components include passages for heat exchangers 18 and pump passages 19. The pump and exchanger passages are welded at their upper part to the upper sole plate 15 and at their lower part to the lower sole plate 16 of the slab. These shells for the passage of the components therefore form stiffeners for the metal structure of the slab 2.

The metal structure of the central part of the slab is additionally strengthened by frusto-conical webs 20 and 21 welded to the inner surface of the slab casing and indented in the region of the shells for the passages for components 18 and 19. The frusto-conical webs 20 and 21 have the axis of the vessel well as their common axis.

The frusto-conical inner strengthening web 20 is welded along its large base to the upper sole plate 15 and along its small base to the inner surface of the inner shell 12 of the slab. The frusto-conical outer web 21 is welded along its large base to the inner surface of the outer shell 14 of the central part 10 of the slab and along its small base to the lower sole plate 16 of this central annular part of the slab.

The diameter of the large base of the inner web 20 is substantially equal to the diameter of the small base of the outer web 21, with the result that the two circular connecting zones between the frusto-conical webs and the upper and lower sole plates 15 and 16 of the slab are substantially arranged vertically one above the other.

The outer shell 14 of the central part 10 of the slab and the lower sole plate 16 are not connected directly by welding but through the intermediary of a horizontal annular plate 23 and a shell 24 having as axis the vertical axis of the slab coinciding with the axis of the vessel well and common to the shells 12 and 14. The outer shell of the central part of the slab is therefore in fact formed by the shells 14 and 24, which are connected by the horizontal annular plate 23. The main vessel 5 of the reactor is welded to the lower part of the outer shell 14, so that an annular space 26 is arranged between the wall of the main vessel 5 and the shell 24, the diameter of which is slightly smaller than the diameter of the vessel. The annular space 26 is filled with a heat-insulating substance which makes it possible to reduce the stresses due to heat gradients in the region of the connecting zone between the vessel and the shell 14 and thereby to improve the behavior of this connection between the vessel and the slab when the reactor is operating.

The peripheral annular part 11 of the slab incorporates an outer casing strengthend by webs 25 arranged radially and filled with concrete. This second annular part 11 of the slab incorporates an inner shell which is, in fact, the outer shell 14 of the central part 10 of the slab, and an outer shell 27 coaxial with the shell 14. The series of the shells 12, 14 and 27 bounding the slab is coaxial and their common axis is that of the vessel well, the slab and the large rotating plug. The shells 14 and 27 are joined at their upper part by the extension of the upper sole plate 15 of the slab on which the shell 12 and the passages for components 18 and 19 are also fixed.

The shell 14 is connected at its lower part to a frusto-conical shell 28 through the intermediary of a horizontal annular plate 30. The shells 27 and 28 are extended downwards below the level of the sole 16 and are welded at their lower part on an annular plate 31 fixed on the upper surface of the vessel well. The plate 31 is fixed by screwing on the end members of the reinforcement rods 32 embedded in the concrete of the vessel well.

An annular space 35 is arranged between the frusto-conical shell 28 and the main vessel 5 of the reactor. Arranged in this annular space is a barrier 36 which makes it possible to prevent the convection currents from reaching the zone of connection between the vessel and the slab.

It will be seen from the above description that both the central annular part 10 of the slab and the peripheral annular part 11 are made in the form of strutted caissons of great strength which are filled with concrete for protection against radiation. In fact, the concrete plays no part where the mechanical strength of the slab is concerned, this mechanical strength being produced by the cooperation of both shells, both sole plates, the frusto-conical reinforcement webs and funnels for components, in the case of the annular central part 10 of the slab. The frusto-conical webs, which have the same axis and are parallel, have generatrices forming an angle of 45° to the vertical, with the result that their top angle has a value of 90°. These frusto-conical webs are welded not only to the shells and sole plates of the part 10 of the slab but also to the funnels 18 and 19 for components, to form a complex strutted structure of great strength.

Above each of the funnels for components a flange 38 makes it possible to fix the component on the slab.

The outer annular part 11 of the slab is strengthened by flat webs, all passing through the axis of the slab which is also the axis of rotation of the rotating plug. This strutted structure is also of very high strength and the combination of both parts of the slab, which are connected by the shell 14, is itself of very high strength, permitting a considerable reduction in the deflection of this slab under the effect of its own weight and of the weight of the components and of the rotating plug, compared to prior art slabs prior art.

This embodiment of the slab resting on the upper part of the vessel well with a sole plate which may be anchored to the vessel well also produces much better behavior in respect of earthquakes, and absorption of the expansions of the slab when the reactor is in operation. As described earlier, the slab is inset in the reactor structure, its bearing sole plate being connected rigidly to the reinforcement of the vessel well. The shape and the size of the components of the slab are calculated to provide behavior in respect of earthquakes and optimum rigidity under the forces exerted by the weight of the components and of the rotating plug.

The main vessel is connected directly to a part of the slab structure, the zone of welding of the main vessel to this component of the slab being situated in a zone protected against the release of heat by the sodium contained in the vessel.

As in the case of prior art slabs, the slab according to the invention may be cooled by means such as a circulation of a liquid or gas in contact with the inner surface of its casing. The lower part of the outer surface of the caisson forming the slab is also thermally insulated in conventional manner.

The frusto-conical webs for strengthening the central part of the slab may have a top angle which is slightly different from 90° and hence an inclination relative to the vertical which is other than 45°. However, this symmetrical arrangement offers advantages in respect of the manufacture of the slab and the production of a strong structure.

The shape of the outer part of the slab may be somewhat different from the shape which has been described and its fixing on the reactor structure may be produced otherwise than by a sole plate connected to the reinforcing members of the vessel well structure.

The slab can for example be fixed by bolting on a sole plate which is itself anchored in the concrete.

The caissons and the strengthening members of the slab can be made of lightly alloyed structural steel.

In order to fill all the parts of the caisson forming the central part of the slab with concrete, openings can be provided in the frusto-conical strengthening webs providing communication between the upper part of the caisson and the lower part.

Finally, the slab for closing the vessel according to the invention is applicable in the case of any fast neutron nuclear reactor the main vessel of which is arranged inside a vertical vessel well closed by a slab.

I claim:

1. In a fast neutron nuclear reactor comprising a concrete cylindrical well (1) with a vertical axis, a vessel contained in said well, an annular slab for closing said vessel resting horizontally on the upper part of said well, said slab (2) consisting of a composite structure of steel and concrete which at least partially carries said vessel (5) suspended from its lower part and which is pierced with cylindrical openings (18, 19) for the passage of components of said nuclear reactor into said vessel (5), the improvement that said slab comprises (a) a first annular central part (10) the outer diameter of which is substantially equal to the diameter of said vessel (5) consisting of a steel caisson filled with concrete comprising an inner shell (12) and an outer shell (14) coaxial with the axis of said vessel well and connected by a horizontal lower sole plate (16) and a horizontal upper sole plate (15) and two first and second frusto-conical reinforcement webs (20, 21) coaxial with the axis of said vessel well and the same angle at the top, one of said webs being connected to said outer shell (14) by its larger base and to said lower sole plate (16) by its smaller base, the other of said webs being connected to said upper sole plate (15) by its larger base and to said inner shell (12) by its smaller base, said smaller base of said first web (21) having substantially the same diameter as said larger base of said second web (20); and (b) a second peripheral annular part (11) connected to said first annular part by its outer shell (14) forming the inner shell of said peripheral part (11), of greater height than the first part, strengthened by flat radial webs (25) extending in planes passing through the axis of said slab, said peripheral part (11) bearing with its lower part on the structure of said reactor (1).

2. Closing slab as claimed in claim 1, wherein said vessel (5) is welded to the lower end of the shell (14) common to both parts of said slab.

3. Closing slab as claimed in claim 2, wherein said shell (14) common to both parts of the slab has a height smaller than the distance between said upper sole plate (15) and said lower sole plate (16), is connected directly to said upper sole plate and through the intermediary of a shell (24) of a smaller diameter to said lower sole plate (16), the space left between the main vessel and said shell (24) of smaller diameter being filled with heat-insulating material.

4. Closing slab as claimed in any one of claims 1 to 3, wherein said peripheral annular part (11) comprises an outer cylindrical shell (27) connected at its upper part to said upper sole plate (15), of a height greater than the height of the central part of said slab, and a frusto-conical inner shell (28) connected to the lower part of said shell (14) common to both parts of said slab, the shells (27 and 28) of said peripheral part (11) being connected at their lower part to a sole plate (31) for resting said slab on said vessel well.

5. Closing slab as claimed in claim 4, wherein said sole plate (31) for resting said slab is fixed rigidly on members (32) reinforcing the concrete of said vessel well.

6. Closing slab as claimed in claim 4, wherein the lower end of said peripheral part (11) of the slab is fixed by bolting on a sole plate, itself anchored in the concrete of the vessel well.

7. Closing slab as claimed in any one of claims 1 to 3, wherein the webs (20, 21) for strengthening said central part (10) have a top angle close to 90°, their generatrices forming an angle close to 45° to the vertical.

8. Closing slab as claimed in any one of claims 1 to 3, wherein the passages for components in the slab consist of cylindrical shells (18, 19) fixed by welding to said upper sole plate and to said lower sole plate at each of their ends and to said frusto-conical webs, along openings provided in the passages for the passage of said components.

9. Closing slab as claimed in any one of claims 1 to 3, wherein said frusto-conical webs (20, 21) are pierced with openings for filling said slab with concrete.

10. Closing slab as claimed in any one of claims 1 to 3, wherein said shells (12, 14, 18, 24, 28), said sole plates (15, 16) and said webs (20, 21, 25) are made of lightly alloyed structural steel.

* * * * *